Patented May 13, 1930

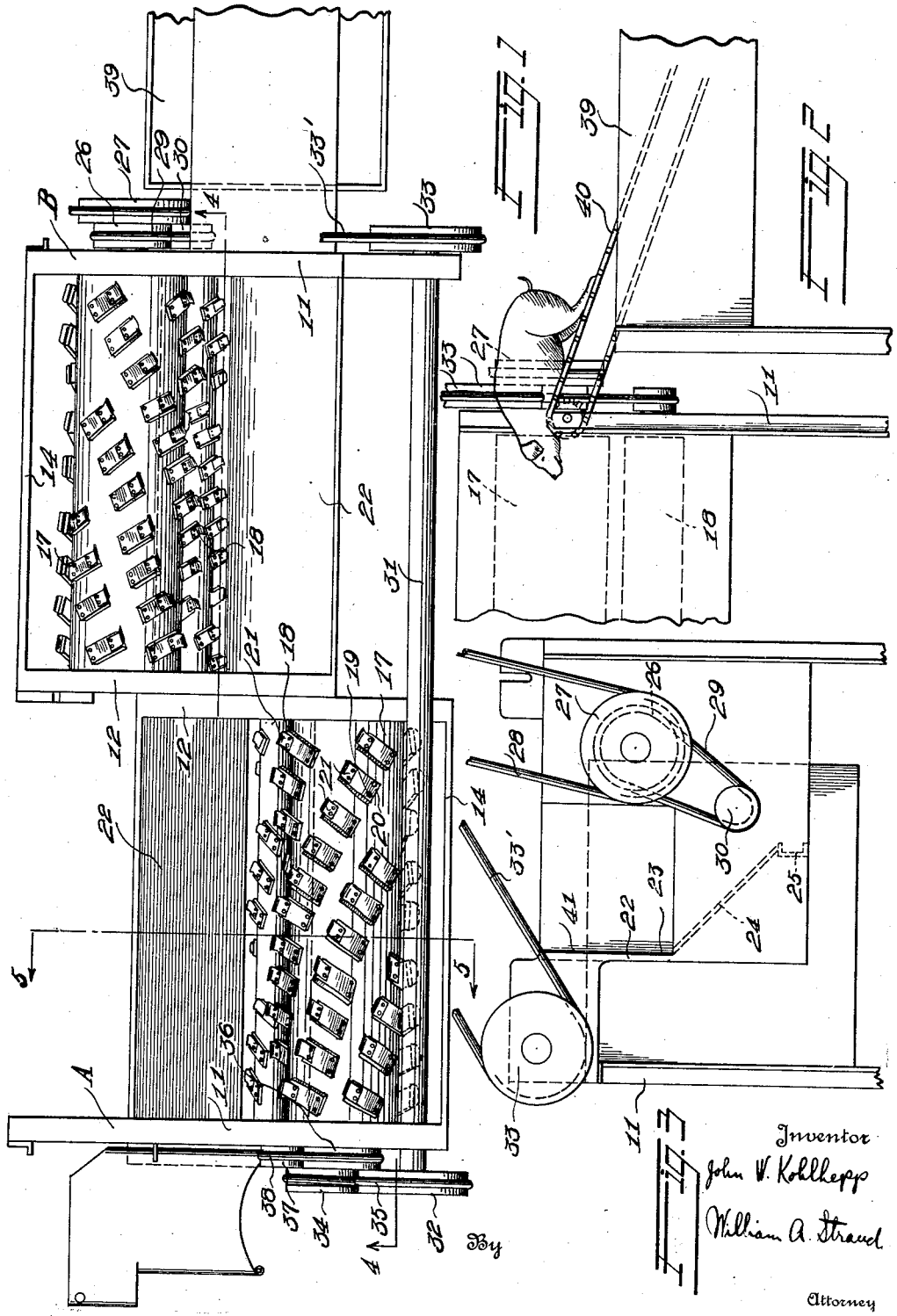

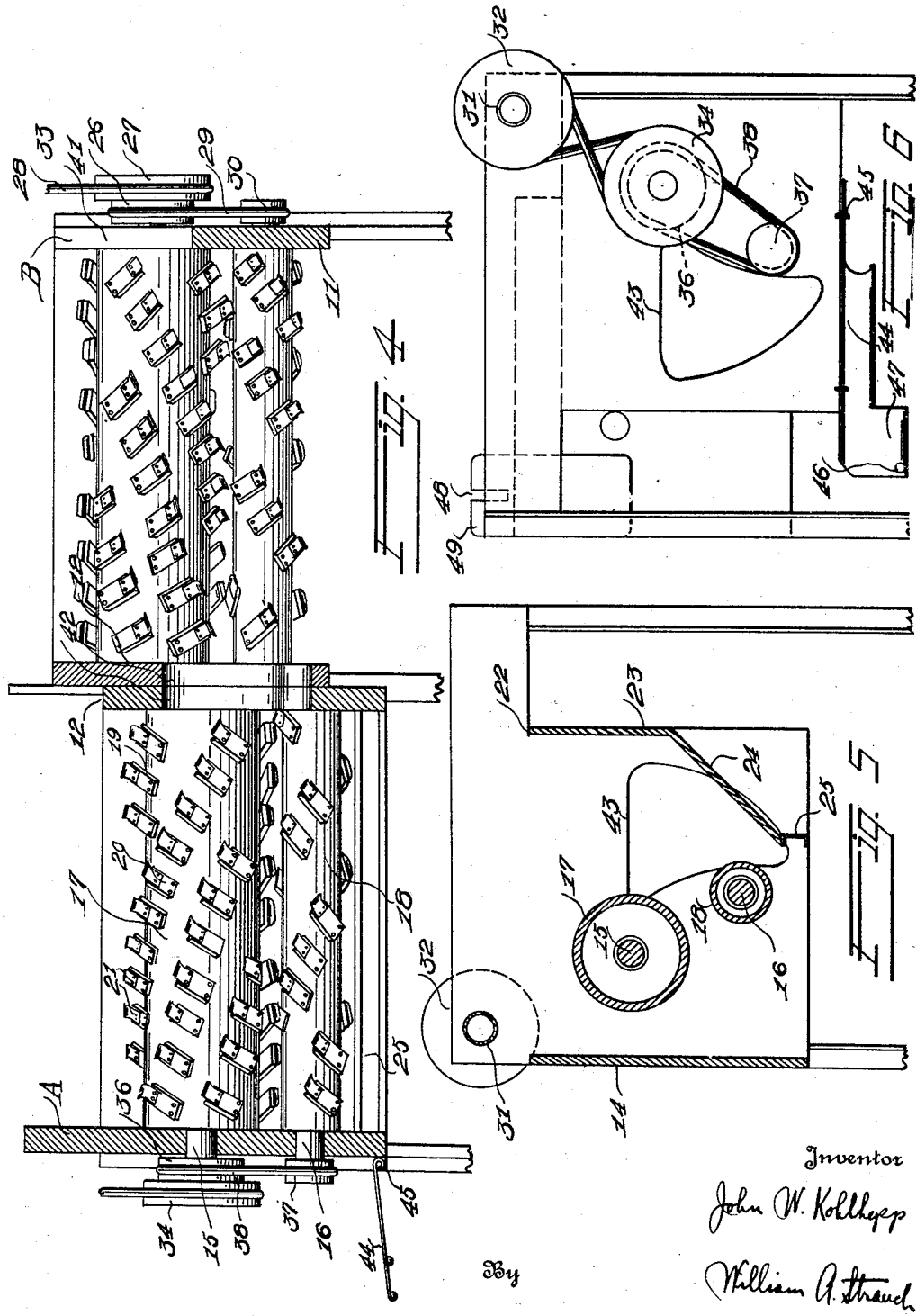

1,758,048

UNITED STATES PATENT OFFICE

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS

APPARATUS FOR DEHAIRING HOGS

Application filed December 19, 1927. Serial No. 241,090.

This invention relates to apparatus for cleaning and dehairing the carcasses of hogs. In the machines and methods heretofore proposed for this purpose, beaters that are used to dehair the carcass are revolved in one direction and the carcass is maintained under the influence of the beaters until the dehairing operation is completed. Such machines are effective except at relatively few points in the carcass, such as for example, adjacent one side of the legs thereof. The machines and methods heretofore proposed were not effective to clean and remove the hair at these points because, when the rotating beaters come in contact with the projecting legs, the carcass is caused to turn quickly away from the beater arms causing the portions of the carcass adjacent the legs to miss thorough contact with the scraping knives carried by the beater arms.

A primary object of this invention is to provide novel apparatus for thoroughly and effectively dehairing carcasses at all points thereof, and preferably includes a plurality of beater mechanisms that are driven in opposite directions and arranged in spaced relation along the predetermined path provided for the passage of the hog carcass, so that the carcass is brought successively to the oppositely rotated beater mechanisms. By this arrangement the portions of the carcass that are relatively inaccessible to the action of the beater mechanisms rotating in one direction are subjected to the action of the reversely rotating beater mechanisms, the last named beater mechanisms being thus effective to thoroughly clean, scrape and dehair the portions of the carcass that are not reached under ordinary methods of operation at present practiced in the art.

A further object of the invention is to provide a dehairing machine including a plurality of series of beater mechanisms arranged end to end, which beater mechanisms include scraping knives or blades so disposed that the feeding of the carcass from one beater mechanism to the other is caused to take place due to the operation of the beater mechanisms themselves and without the use of separate feeding mechanisms to successively bring the carcass into the zone of operation of the several beater mechanisms.

A still further object of the invention is to provide dehairing apparatus including revolvable beater mechanisms disposed in spaced relation to a relatively smooth surface over which the carcass is moved, and in which the beater mechanism is provided with beater elements arranged angularly or substantially spirally so that the beater elements themselves feed the carcass along said relatively smooth surface during their normal operation in dehairing the carcass.

A further object of the invention is to provide a plurality of beater mechanisms each disposed to automatically feed the carcass in a direction substantially parallel to the axes of the beater mechanisms and to provide means whereby the carcasses may be maintained in the zone of operation of said mechanisms at the will of the operator until the operation is completed.

A still further object of the invention is to provide a dehairing apparatus embodying a plurality of sets of beater mechanisms constructed of a plurality of interchangeable units, the desired reversely rotating beater mechanisms being obtained by simply arranging the units so that the beater mechanisms of the several units are disposed at opposite sides of the path of movement of the carcass through the machine.

A still further object of the invention is to provide dehairing apparatus that is extremely simple and inexpensive to make and that is, at the same time, thoroughly practical and effective to completely dehair carcasses in the shortest possible time.

Further objects of the invention will appear as a description thereof proceeds with reference to the accompanying drawings in which:—

Figure 1 is a plan view of an embodiment of a preferred form of the invention.

Figure 2 is a fragmentary side elevation of the feed end of the apparatus disclosed in Figure 1 showing a carcass in position to be fed into the machine.

Figure 3 is an end view of the apparatus viewed from the right of Figure 1, the scalding tank being omitted.

Figure 4 is a vertical section taken on the planes indicated by the broken lines 4—4 in Figure 1 looking in the direction of the arrows.

Figure 5 is a transverse vertical section taken on the plane indicated by the line 5—5 in Figure 1, looking in the direction of the arrows.

Figure 6 is an end view of the apparatus as viewed from the discharge end thereof.

Like reference characters indicate like parts throughout the several figures.

As shown on the drawings, the machine of this invention comprises a plurality preferably a pair of units A and B arranged end to end. Said units are substantially the same in construction, but are positioned with the beater mechanisms on opposite sides of the path of travel of the carcass through the apparatus. Each unit comprises end frames 11 and 12 rigidly secured in fixed relation by longitudinal members 14 to form a framework open at the top and bottom thereof. Journaled in the end frames 11 and 12 of each of the units, are shafts 15 and 16 carrying drums 17 and 18 extending from the wall 11 to the wall 12 of each unit. Preferably, the drum 17 is larger than the drum 18, the drum 17 being preferably twice as great in diameter as the drum 18, though it should be understood that this invention is not restricted to drums proportioned as just stated. Preferably, but not necessarily, the axis of the drum 18 is located on, or relatively close to a vertical tangent to the drum 17. In the drawings the exemplification of the invention illustrated includes a drum 18, the axis of which is on the vertical tangent of drum 17.

Arranged on each of the drums 17 and 18 are a multiplicity of beater arms 19 of relatively flexible material such as rubber or canvas or combinations thereof. The beater arms 19 are secured at one end 20 thereof to the surface of the drum in any well known manner. The opposite ends of the beater arms are free of connection to the drum and carry outwardly turned scraper blades 21 of well known form. The beater arms 19 are arranged substantially spirally on the surface of the drums 17 and 18 and in relatively close relation to each other, as indicated in Figure 1 of the drawing, and for a purpose presently to be described.

Disposed in spaced relation laterally of the drums carrying the beater arms as above described, are relatively smooth guide members 22 comprising a substantially vertically extending portion 23 and in an inclined portion 24 extending from said vertical portion toward the beater mechanism, but spaced therefrom. The member 22 is supported at its ends by the end frame members 11 and 12 and the extremity of portion 24 may be supported on a longitudinal member 25 as clearly shown in Figure 5.

For convenience in construction the several units of the apparatus are constructed as just described and the complete apparatus is formed by arranging the units end to end with the beater mechanisms on opposite sides of the path of travel of the carcasses through the machines, as above pointed out and as shown in the drawings. It should be understood however, that each unit is in itself capable of satisfactorily dehairing carcasses and that this invention is not restricted to an apparatus including more than a single unit, but that each unit constitutes a dehairing device in itself and is to be regarded as part of this invention.

In order to drive the beater mechanisms the pulleys 26 and 27 are secured to extensions of the shaft 15 of the drum 17. Said pulleys rotate as a unit with each other and with shaft 15 and drum 17. Rotation is imparted to the pulleys 26 and 27 and shaft 15 by a belt 28 (Figure 3) suitably driven from a power shaft not shown. Endless belt 29 passing over pulley 26 and a pulley 30 secured to an extension of shaft 16, serves to drive said shaft and the drum 18 carried thereby, in the same direction as the drum 17. It will be observed that the pulley 30 is smaller than the pulley 26 so that the angular velocity of the drum 18 is about twice that of the drum 17. However, as the size of the drum 18 is correspondingly smaller it will be observed that the surface speed of the drums 17 and 18 is substantially the same.

In order to drive the beater mechanisms of the unit A of the machine a shaft 31 is provided extending longitudinally of the apparatus. Such shaft is journaled in the end members 11 of the units A and B and has fixed to its ends, pulleys 32 and 33. The pulley 33 is driven by a belt 33' operated by a pulley on the power shaft (not shown). The pulley 32 is operatively connected to a pulley 34 secured to the end of shaft 15 by means of a crossed belt 35 as shown in Figure 6. Shaft 15 of unit A also carries a pulley 36 (Figure 1) that is operatively connected to a pulley 37 on shaft 16 of drum 18 by means of an endless belt 38. By the arrangement just described the drums 17 and 18 of unit A are rotated in a reverse direction from the direction of rotation of said drums in unit B.

A scalding tank 39 is provided adjacent one end of the apparatus. The carcasses are taken from said tank by an endless conveyor 40 and fed into one end of one of the units through a feed opening 41 in a direction so that the longitudinal axis of the carcass is roughly parallel to the axes of the drums of the beater mechanisms as clearly shown in Figure 2. Preferably, but not necessarily, the carcasses are fed into the apparatus at a point substantially above the inclined supporting portion 24 of the guide member 22, so that the carcasses will drop under the action of gravity into the pocket or channel bounded by portion 24 on the one side and by the beater mechanisms on the other side. The carcasses are thus brought forcibly and positively into engagement with the rotating beater mechanisms and the dehairing operation is thus begun. In view of the fact that the beater arms 19 are spirally arranged on drums 17 and 18 the carcass is caused to move along the guide member 22 while it is being operated upon by the beater mechanism. It is thus caused to move toward the aligned openings 42 in the end members 12 of the units A and B and to be moved through said opening into the zone of operation of the beater mechanisms of the unit A. As previously stated, the drums 17 and 18 of unit A rotate opposite from the drums of unit B. As a result, when the carcass is brought into the zone of the beater mechanism of unit A it is subjected to a scraping action that is reverse to the action to which the carcass was subjected when in unit B, and the carcass itself is rotated oppositely about a longitudinal axis when wholly in the unit A. As the carcass moves through the alined openings 42 it is partially subject to the action of the two sets of oppositely rotating drums. Accordingly its rotation in one direction will be gradually stopped and its reverse rotation will as gradually begin as it moves more completely within the zone of operation of the beater mechanism in unit A. When it is wholly within this unit, it will be reversely rotated at approximately the same speed at which it was rotated in the opposite direction in unit B.

In order to control the time during which the carcass shall remain subjected to the action of the beater mechanism a control gate is provided to maintain the carcass in the apparatus until the dehairing operation is completed. Said gate is preferably applied so that it may be moved over the discharge opening 43 in member 11 of unit A to prevent the discharge of the carcass through said opening by the spirally arranged beater arms of the beater mechanism of said unit. As shown on the drawings a gate 44 hinged at 45 on the end frame 11 is provided, which is formed so that it will close the opening 43 when it is in its elevated position. It may be brought to this position and held by a flexible cord or chain that may be attached to the eye 46 of an extension 47 of said gate. In order to hold the gate in its raised position the cord or chain may be provided with an enlargement in the proper position, so that when the body of the cord or chain is inserted in the slot 48 of holding member 49, the gate will be held in position to maintain the carcass within the zone of operation of the beater mechanism. It will be understood that if only a single unit is employed that a gate such as the gate 44 may be applied to control the discharge of the carcass from the opening 42 in said unit. It will also be understood that three or more units may be similarly combined so that the carcass can be alternately subjected to a beating action applied in opposite directions as the carcass moves through the several units under the action of the beater arms arranged spirally or in inclined relation on the surface of the drums.

In operation, the carcasses are fed from the scalding tank 39 by the conveyor 40 through the opening 41 into unit B of the apparatus shown in the drawings. As before pointed out, the carcass drops into the pocket or channel provided by the relatively smooth member 22 on the one side and the superposed spaced drums embodying beater arms on the other side. The rotation of the drums and the flexible arms carried thereby causes the carcass to rotate about its longitudinal axis and to move along the smooth surface of the member 22 toward the discharge opening 42 of unit B. During its movement toward said openings the carcass is subjected to the angular beating action of the scraper blades 20 carried by the beater arms 19 and inasmuch as the drums are of varying sizes and are disposed so that a tangent common to the two drums extends at a substantial angle to the vertical, the scraper blades on the several drums engage and strike the carcass at different angles thereby very effectively dehairing the hog. This action continues until the carcass is fed by the beater mechanism through the aligned openings 42 into the zone of operation of the oppositely rotating beater mechanism of unit A where the action just described is repeated but in a reverse direction. In this way the portions of the carcass that would not be reached effectively because of projections from the carcass such as the legs of the hog, in unit B, will be very effectively reached and cleaned in unit A. For relatively large plants, the units may be long enough that the carcasses can pass continuously without interruption from end to end of the apparatus and be thoroughly cleaned and dehaired. In smaller plants however, a machine embodying smaller units may be used. In such cases it may be necessary to employ an adjustable gate such as the gate 44, to maintain the carcass or carcasses in the zone of operation of the dehairing mechanism a longer time than would be necessary for the inclined beater arms to feed the carcass through the section.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Accordingly, what is desired to be secured by Letters Patent and is claimed as new is:—

1. A dehairing machine comprising a plurality of units each unit consisting of revolvable dehairing and feeding mechanism and guide means along which the carcass is moved by said feed mechanism, said units being disposed end to end with the dehairing and feeding mechanism of one unit at one side of the path between said mechanism and guide means, and the other dehairing and feeding mechanism being arranged on the other side of said path.

2. A dehairing machine comprising an elongated channel one side of said channel being formed by relatively smooth carcass guiding means, the other side of said channel being formed by a pair of rotatable drums carrying beater arms, and means to control the movement of the carcass endwise of said channel.

3. A dehairing machine comprising an elongated channel, one side of said channel being formed by relatively smooth carcass guiding means, the other side of said channel being formed by a pair of rotatable drums carrying beater arms arranged on a substantially spiral path around each of said drums, whereby said beater arms feed the carcass along said means, and mechanism to control the discharge of the carcasses from said channel.

4. A dehairing machine comprising an elongated channel, one side of said channel being formed by relatively smooth carcass guiding means, the other side of said channel being formed by a pair of rotatable drums, one of said drums being of substantially larger diameter than the other, the larger drum being spaced above said smaller drum, each of said drums carrying beater arms arranged to dehair the carcass as it moves endwise of said channel, and means to rotate said drums.

5. A dehairing machine comprising an elongated channel, one side of said channel being formed by relatively smooth carcass guiding means, the other side of said channel being formed by a pair of rotatable drums one of said drums being of substantially larger diameter than the other, the larger drum being spaced above said smaller drum with its axis at one side of the vertical plane containing the axis of the smaller drum, beater arms secured to said drums, said beater arms being angularly disposed with respect to the axis of the drums so that the carcass will be moved endwise of said drums and guiding means when the drums are rotated, and means for rotating the drums.

6. A dehairing machine comprising an elongated channel, one side of said channel being formed by relatively smooth carcass guiding means, the other side of said channel being formed by a pair of rotatable drums one of said drums being of substantially larger diameter than the other, the larger drum being spaced above said smaller drum, beater arms arranged substantially spirally of each of said drums and means for rotating said drums at substantially different angular velocities.

7. A dehairing machine comprising an elongated channel, one side of one portion of said channel being formed by relatively smooth carcass guiding means, the other side of said portion of the channel being formed by rotatable dehairing mechanisms, another portion of said channel including a relatively smooth carcass guiding means arranged at the opposite side of said channel from said first named carcass guiding means, and a reversely rotating beater mechanism in said other portion disposed at the side of said channel opposite to the first named beater mechanism.

8. A dehairing machine including an elongated channel, one side of one portion of said channel being formed by relatively smooth carcass guiding means, the other side of said portion of the channel being formed by rotatable dehairing mechanisms having arms disposed to feed the carcass through said portion of the channel, another portion of said channel including a relatively smooth carcass guiding means arranged at the opposite side of said channel from said first named carcass guiding means, and a reversely rotating beater mechanism disposed at the side of said channel opposite to the first named beater mechanism, said beater mechanism including arms positioned to take a carcass from said first named portion and feed it through said second named portion.

9. A dehairing machine including an elongated channel, one side of one portion of said channel being formed by relatively smooth carcass guiding means, the other side of said portion of the channel being formed by rotatable dehairing mechanisms having arms disposed to feed the carcass through said portion of the channel, another portion of said channel including a relatively smooth carcass guiding means arranged at the opposite side of said channel from said first named carcass guiding means, and a reversely rotating beater mechanism disposed at the side of said channel opposite to the first named beater mechanism, said beater mechanism including arms positioned to take a carcass from said first named portion and feed it through said second named portion, and a manually operable gate to control the discharge of the carcass from said channel.

10. A dehairing machine comprising an elongated channel one side of a portion of said channel being formed to guide the carcass endwise of the channel, a pair of rotatable drums carrying beater arms disposed opposite said guiding means in said portion of said channel, another portion of said channel being provided with carcass guiding means disposed on the other side of said channel from the first named guiding means, a pair of rotatable drums carrying beater arms arranged opposite said last named guiding means, and means for rotating all of said drums, the means for rotating said last named pair of drums being designed to rotate them in a direction opposite from the direction of rotation of the first named pair of drums.

In testimony whereof I affix my signature.

JOHN W. KOHLHEPP.